United States Patent [19]
Imai

[11] Patent Number: 5,392,586
[45] Date of Patent: Feb. 28, 1995

[54] ARTICLE TRANSFERRING/WRAPPING APPARATUS

[75] Inventor: Hiroaki Imai, Tokyo, Japan

[73] Assignee: Japan Tobacco, Inc., Tokyo, Japan

[21] Appl. No.: 38,604

[22] Filed: Mar. 29, 1993

Related U.S. Application Data

[63] Continuation-in-part of Ser. No. 858,687, Mar. 27, 1992, abandoned.

[30] Foreign Application Priority Data

Mar. 29, 1991 [JP] Japan ................... 3-91725

[51] Int. Cl.6 ............................. B65B 11/28
[52] U.S. Cl. ................................ 53/234
[58] Field of Search ............... 198/470.1; 53/149, 225, 53/230, 232, 233, 234, 272, 308

[56] References Cited

U.S. PATENT DOCUMENTS

| | | | |
|---|---|---|---|
| 952,256 | 3/1910 | Jacobsen | 53/234 |
| 3,412,520 | 11/1968 | Schmermund | 53/230 X |
| 3,739,545 | 6/1973 | Lattke | 53/230 X |
| 3,899,865 | 8/1975 | Revaz | 53/234 |
| 4,095,396 | 6/1978 | Seragnoli | 53/234 |
| 4,559,757 | 12/1985 | Focke et al. | 53/234 X |
| 4,823,536 | 4/1989 | Manservigi et al. | |
| 4,848,060 | 7/1989 | Kubis | 53/308 |
| 4,947,617 | 8/1990 | Focke et al. | 53/234 X |

FOREIGN PATENT DOCUMENTS

1425009 11/1971 United Kingdom.
2191166 12/1987 United Kingdom.

Primary Examiner—Linda B. Johnson

[57] ABSTRACT

An apparatus has an article sending-side first rotary wheel and an article receiving-side second rotary wheel. These rotary wheels are disposed adjacent to each other and are rotated in opposite directions at the same peripheral velocity. A plurality of heads are disposed on each of the rotary wheels. These heads are rotatably provided to the rotary wheels. The heads of the first rotary wheel and the heads of the second rotary wheel are maintained to oppose each other while they pass a transfer section as a portion in which the rotary heads are adjacent to each other. Plates for holding an article are provided to these heads. When the heads of the second rotary wheel move through the transfer section, the plates of these heads are open to transfer the article from the heads of the first rotary wheel to the heads of the second rotary wheel.

2 Claims, 13 Drawing Sheets

ARTICLE TRANSFERRING/WRAPPING APPARATUS

This application is a continuation-in-part of application Ser. No. 07/858,687, filed on Mar. 27, 1992, now abandoned, the entire contents of which are hereby incorporated by reference.

BACKGROUND OF THE INVENTION

1. Field of the Invention

The present invention relates to an apparatus for transferring an article between a pair of rotating wheels or an apparatus for wrapping an article during transfer. More specifically, the present invention relates to an apparatus for transferring cigarettes of one package between the pair of wheels rotating at a high speed and for wrapping the cigarettes with a wrapping material during transfer.

2. Description of the Related Art

Conventionally, in the process of manufacturing and wrapping an article, e.g., cigarettes, an apparatus for transferring cigarettes or wrapped cigarettes and for wrapping the cigarettes during transfer is available. U.S. Pat. No. 4,823,536 discloses an example of such an apparatus.

This apparatus has a pair of rotary wheels which rotate at the same peripheral velocity in opposite directions. A plurality of heads are provided to each of these wheels along the circumferential direction. Each head has a portion for holding an article. The directions of the heads on the respective wheels are controlled by cam mechanisms or the like. Thus, when a head of one wheel and a head of the other wheel approach each other, they oppose each other while they move through a predetermined section. While these heads oppose each other, an article is transferred from the head of one wheel to the head of the other wheel. When wrapping paper or the like is supplied between the heads opposing each other during transfer of the article, the article to be transferred is wrapped and packaged by the wrapping paper.

The apparatus of this type is used for transferring an article between two manufacturing and wrapping apparatuses or wrapping the article in the manner as described above in, e.g., the process of manufacturing and wrapping cigarettes.

However, this apparatus has various drawbacks that need improvement. For example, when cigarettes of one package are to be wrapped, e.g., 20 cigarettes are stacked in three layers respectively including 7, 6, and 7 cigarettes in a staggered manner to constitute a cigarette group (a unit of one-package cigarettes in which 20 cigarettes are stacked in three layers), and this cigarette group is wrapped. However, this cigarette group can easily collapse and it is difficult to directly transfer this cigarette group as it is. Especially, as the speed of the cigarette manufacturing/wrapping apparatus is increased recently, it is difficult to transfer the cigarette group between a pair of wheels at a high speed without collapsing it.

SUMMARY OF THE INVENTION

The present invention has been made in view of the above situation, and has as its object to provide an apparatus for transferring one-package cigarettes (cigarette group) stacked in, e.g., three layers at a high speed without collapsing them, or an apparatus for wrapping the cigarette group during transfer.

The apparatus according to the present invention has a sending-side first rotary wheel and a receiving-side second rotary wheel. These wheels are arranged close to each other and are rotated in opposite directions at the same peripheral velocity. A plurality of heads are provided on each of these rotary wheels at the same pitch in the circumferential direction. The directions of the heads are controlled by a pivot mechanism so that they are directed in a predetermined direction in response to rotation of the rotary wheels. The heads on the rotary wheels accurately oppose each other while they are close to each other, i.e., while they move through a transfer section. An article is transferred from the heads of the first rotary wheel to the heads of the second rotary wheel while the heads move through the transfer section.

A pair of plates are provided to these heads. The article, e.g., aligned cigarette group is held between the plates. The plates of the heads of the receiving-side second rotary wheel are opened/closed by an opening/closing mechanism and are open when the corresponding heads move through the transfer section. Hence, while the heads move through the transfer section, the plates of the heads of the receiving first rotary wheel are inserted between open plates of the heads of the receiving-side second rotary wheel and are withdrawn. The article is transferred during this withdrawal.

In an embodiment of the present invention, sliders are provided to the heads. These sliders move into or are withdrawn from the plates while the corresponding heads move through the transfer section, thereby pushing out and transferring an article held between the plates. When the slider of the sending-side first rotary wheel moves into the plates, the slider of the receiving-side second rotary wheel is withdrawn from the plates in synchronism with movement of the slider of the sending-side first rotary wheel.

In the embodiment of the present invention, fitting guide members are provided to the heads. These fitting guide members are fitted with and slide on each other as the corresponding heads oppose each other, and cause the heads to accurately oppose each other while they move through the transfer section.

To wrap an article, e.g., a cigarette group during transfer, a tacker member for edge-folding the end portion of wrapping paper wrapping the cigarette group is provided.

The apparatus having the above arrangement operates in the following manner. An article, e.g., a cigarette group is supplied to a head of one rotary wheel. This cigarette group is held between the pair of plates so that it will not collapse. While the head of the first rotary wheel holding the cigarette group and the head of the second rotary wheel pass through the transfer section, the directions of these heads are controlled by pivot mechanisms, and the heads of the two rotary wheels oppose each other. The plates of a head of the second rotary wheel are opened, the plates of the first rotary wheel are inserted between the plates of the second rotary wheel, and the cigarette group is transferred in this state. Hence, the cigarette group can be transferred at a high speed without collapsing.

While the heads move through the transfer section, the article is reliably transferred as it is pushed by the slider, the distance between the slider of the first rotary wheel and the slider of the second rotary wheel is maintained at a predetermined value, and the article is transferred as it is held between these sliders. Hence, even if the article is of a type which collapses easily like a cigarette group in which cigarettes are stacked in a staggered manner, it can be transferred stably.

When the heads move as they oppose each other, the fitting guide members provided to the heads slide on each other as they are fitted with each other, thereby guiding the heads to accurately opposing states. As a result, the play and other errors of the cam mechanism are removed, and the heads are constantly maintained to accurately oppose each other.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

Further, when each of the heads of the first rotary wheel and each of the heads of the second rotary wheel move through the transfer section, the following operations are performed.

The slider of the head of the second rotary wheel is brought into contact with a front end portion of an article held between the plates of the head of the first rotary wheel. Wrapping paper inserted between the heads are clamped and held at a predetermined position between the front end portion of the article and the slider of the head of the second rotary wheel. The plates of the head of the second rotary wheel are opened, and the plates of the head of the first rotary wheel are inserted between the opened plates of the head of the second rotary wheel. The slider of the head of the second rotary wheel is moved backward in synchronism with the insertion of the plates of the head of the first rotary wheel, thereby to keep the wrapping paper clamped and held between the front end portion of the article and the slider of the head of the second rotary wheel. Further, the wrapping paper is folded due to the insertion of the plates of the head of the first rotary wheel, thereby to wrap the article.

In such a manner, the apparatus mechanically clamps and holds wrapping paper. Thus, the holding of the wrapping paper is accurately and assuredly performed. Further, since the sliders have simple mechanical structure, they are operated without the need to utilize negative pressure or the like, and their operations are simple and can be easily performed at a high speed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

The preferred embodiments of the present invention will be described below. FIGS. 1 to 18 show the first embodiment of the present invention. The apparatus of the first embodiment is an apparatus for transferring, as an article, a cigarette group (a unit of one-package cigarettes in which 20 cigarettes are stacked in three layers) obtained by stacking a total of 20 cigarettes aligned in three layers respectively including, e.g., 7, 6, and 7 cigarettes, in three layers in a staggered manner, and for wrapping this cigarette group by wrapping paper during transfer.

Figure 1:
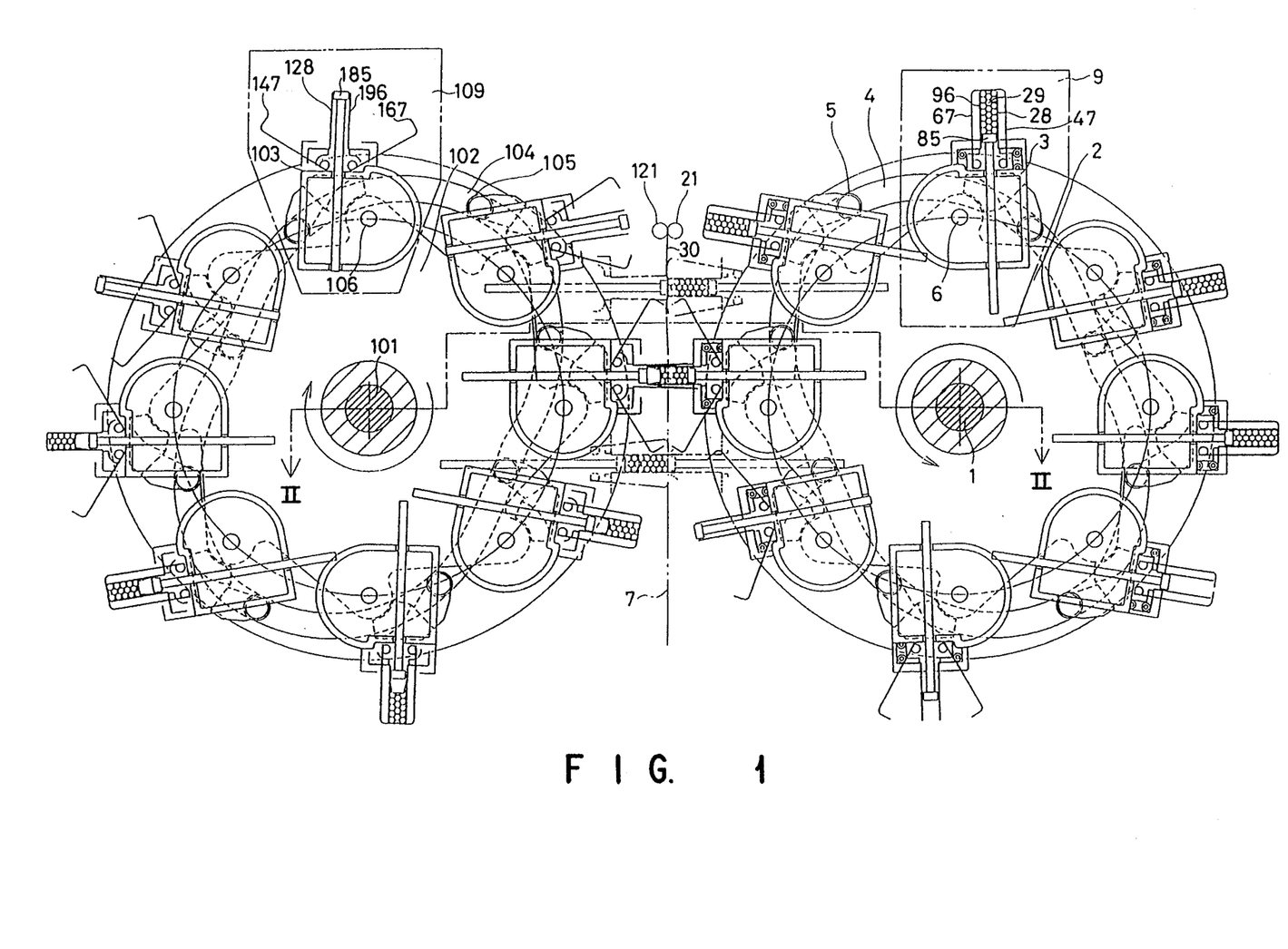
FIG. 1 is a schematic front view showing an apparatus according to the first embodiment of the present invention.
Figure 2:
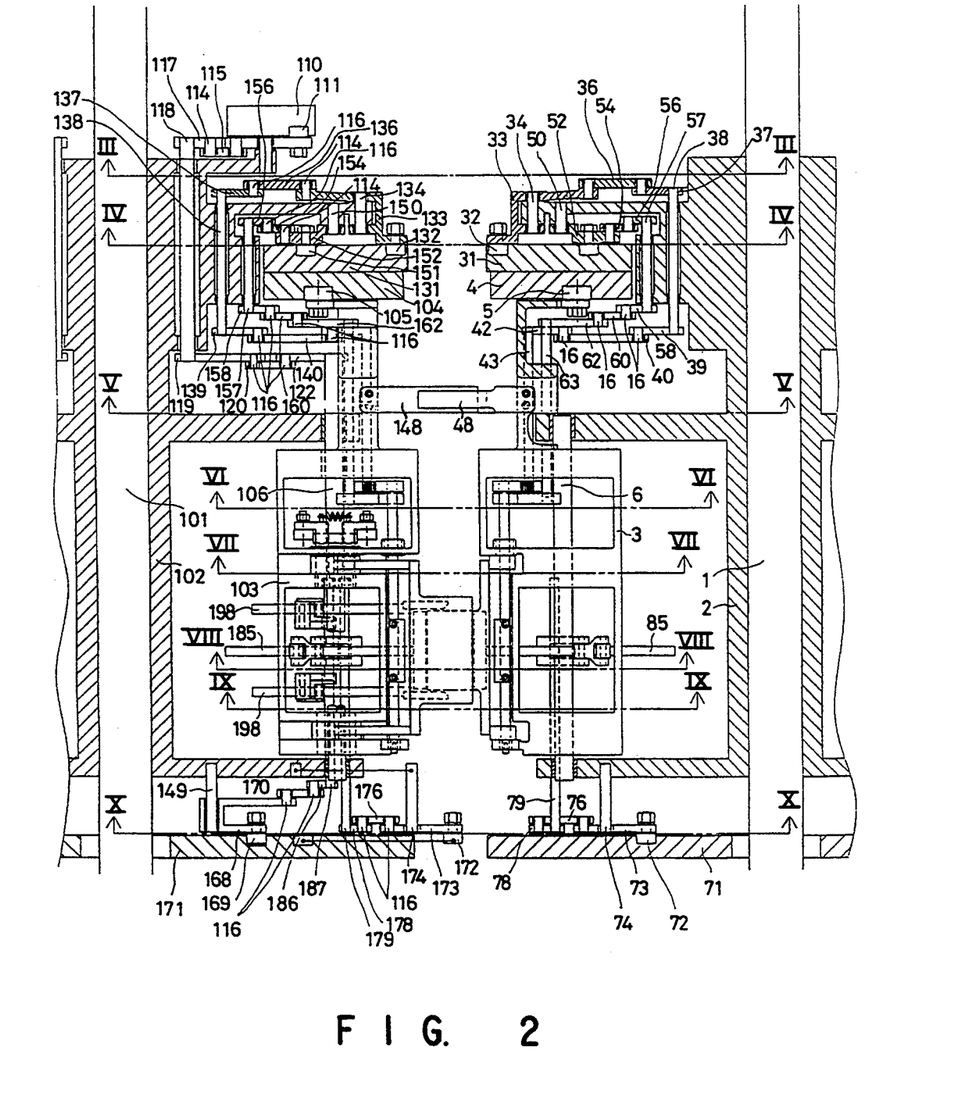
FIG. 2 is a sectional view taken along the line II—II of FIG. 1.

The overall arrangement of this apparatus will be described. As shown in FIGS. 1 and 2, this apparatus has a pair of rotary wheels, i.e., a sending-side first rotary wheel 2 and a receiving-side second rotary wheel 102. The wheels 2 and 102 rotate about shafts 1 and 101, respectively, and the shafts 1 and 101 are disposed parallel to each other. The wheels 2 and 102 are rotated in opposite directions at the same speed by drive mechanisms (not shown). Hence, at a portion in which the wheels 2 and 102 are close to each other, they move in the same direction at the same peripheral velocity.

The wheels 2 and 102 have a plurality of e.g., eight heads 9 and eight heads 109, respectively. The heads 9 or 109 are disposed at the same pitch on the same circumferential line. Each head 9 has a pivotal body 3, and each head 109 has a pivotal body 103. Each pivotal body 3 is mounted on the pivotal wheel 2 through a shaft 6, and each pivotal body 103 is mounted on the pivotal wheel 102 through a shaft 106. A pair of plates 28 and 96 are provided at the front end portion of the pivotal body 3, and a pair of plates 128 and 196 are provided at the front end portion of the pivotal body 103. An article, e.g., a cigarette group 29 aligned in three layers as described above is held between the plates 28 and 96 or between the plates 128 and 196. The second wheel 102, i.e., the receiving-side plates 128 and 196 are opened and closed by an opening/closing mechanism to be described later.

A pair of holder plates 47 and 67 are provided at the front end portion of the pivotal body 3, and a pair of holder plates 147 and 167 are provided at the front end portion of the pivotal body 103. These holder plates are opened and closed by opening/closing mechanisms to be described later. When the holder plates 47 and 67 or 147 and 167 are closed, they close the distal end portions of the plates 28 and 96 or 128 and 196 to hold the cigarette group 29 so that the cigarette group 29 held between the plates 28 and 96 or 128 and 196 may not collapse or drop by the centrifugal force.

Figure 11:
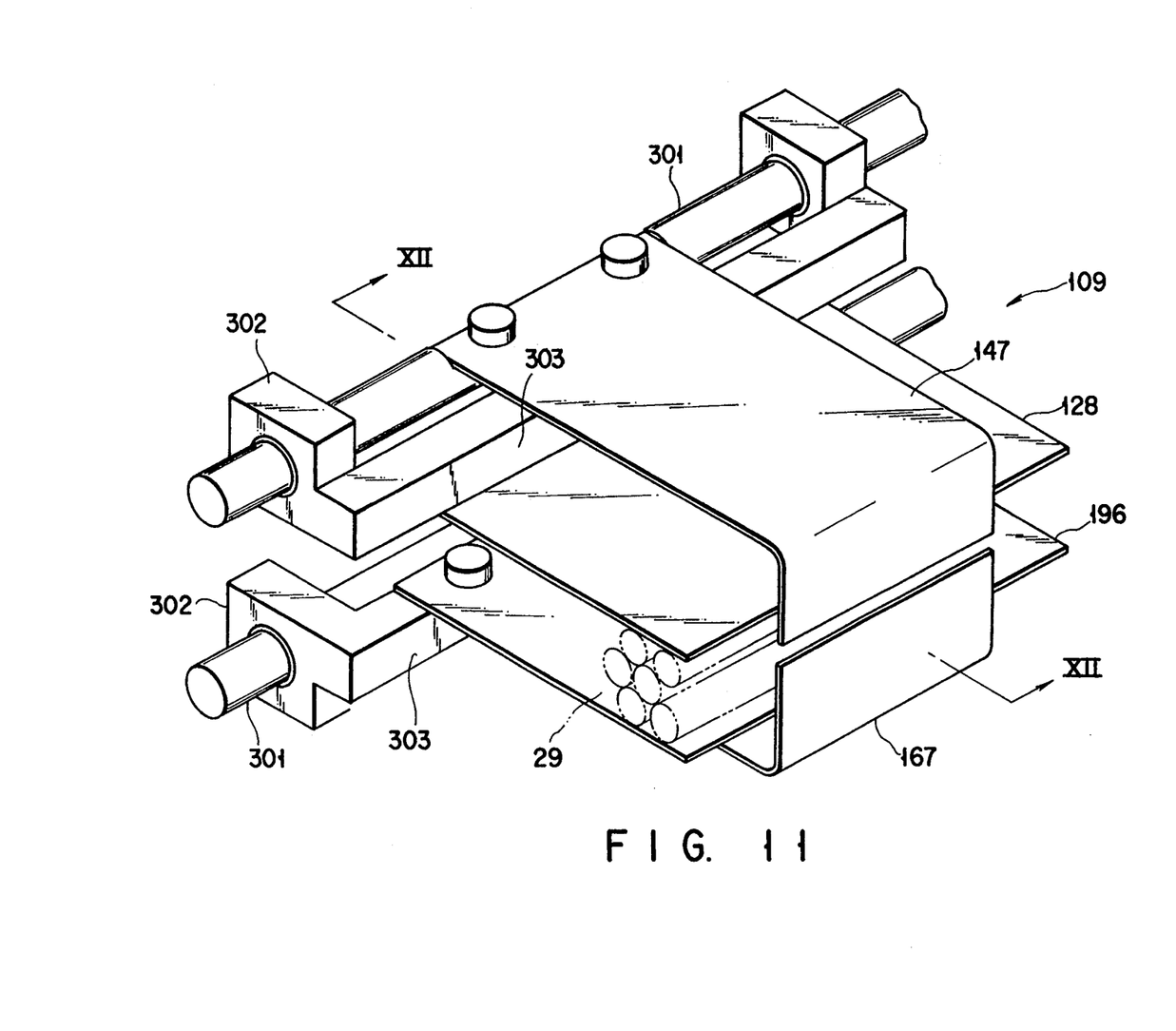
FIG. 11, is a perspective view of a portion of a head of an apparatus according to the second embodiment of the present invention.
Figure 12:
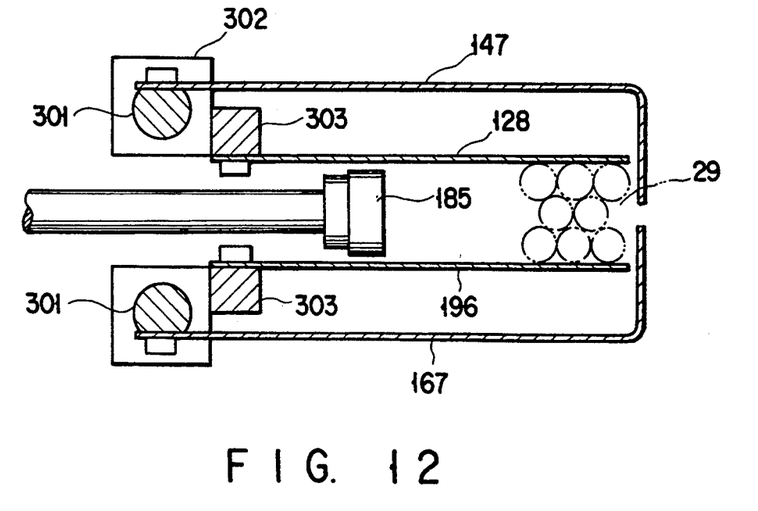
FIG. 12 is a sectional view taken along the line XII—XII of FIG. 11.

A pair of shafts 301 are rotatably provided at the pivotal body 3, and a pair of shafts 301 are rotatably provided at the pivotal body 103, the shafts 301 being shown in FIG. 11. The holder plates 147 and 167 are attached to the shafts 301, and are opened/closed by rotation of the shafts 301. Plate support members 302 are rotatably supported by the shafts 301. Center portions of the plate support members 302 constitute beam-shaped portions 303 to which the plates 128 and 196 are attached, and which do not interfere with the opening/closing of the holder plates 147 and 167. The plate support members 302 are rotated, thereby to open/close the plates 128 and 196.

The rotating of shafts 301 and the rotating of the plate support members 302 are performed separately from each other, by cam mechanisms described later. Therefore, the opening/closing of the holder plates 147 and 167, and the opening/closing of the plate 128 and 196 are also performed separately from each other. Since a degree at which the plates 128 and 196 are opened/closed is small, the opening/closing of the plates 128 and 196 do not interfere with the opening/closing of the holder plates 147 and 167.

The head 9 of the first rotary wheel 2 has the same structure as the head 109 of the second rotary wheel 102, which is shown in FIG. 11.

The pivotal bodies 3 and 103 of the heads 9 and 109 have sliders 85 and 185, respectively. The sliders 85 and 185 are moved forward or backward by moving mechanisms to be described later. When the sliders 185 and 85 are moved backward and forward, respectively, the cigarette group 29 held between the plates 28 and 96 is pushed out; when the sliders 85 and 185 are moved backward and forward, respectively, the cigarette group 29 held between the plates 128 and 196 is pushed out. The slider which is moving backward holds one side surface of the cigarette group 29 so as to prevent it from collapsing.

When the first and second rotary wheels 2 and 102 are rotated in the opposite directions, the heads 9 and 109 are moved in the same direction at the same peripheral velocity as they pass through the transfer section in the vicinity of an intermediate line 7 between the wheels 2 and 102. In response to the rotation of the rotary wheels 2 and 102, the pivotal bodies 3 and 103 of the heads 9 and 109 are pivoted to oppose each other at this transfer section. Hence, when the heads 9 and 109 are moved through this section, they oppose each other. Then, the plates 28 and 96 of the head 9 of the first rotary wheel 2 are inserted between the plates 128 and 196 of the head 109 of the second wheel 102. At this time, the slider 185 of the head 109 of the second rotary wheel 102 is moved backward, and thereafter the plates 28 and 96 of the first rotary wheel 2 are withdrawn from the portion between the plates 128 and 196 of the second rotary wheel 102. At this time, the slider 85 of the head 9 of the first wheel 2 extends into a portion between the plates 28 and 96 to transfer the cigarette group 29 held between the plates 28 and 96 from the head 9 of the first rotary wheel 2 to the head 109 of the second rotary wheel 102.

Wrapping paper 30 is supplied by a pair of rollers 21 and 121 along the intermediate line 7. When the plates 28 and 96 of the first head 9 are inserted between the plates 128 and 196 of the second head 109, the wrapping paper 30 is folded in the U-shaped manner, and the cigarette group 29 is wrapped by the wrapping paper 30.

A cigarette group 29 is inserted between the plates 28 and 96 on the first wheels 2 in a direction perpendicular to the surface of the sheet of FIG. 1 at a position substantially opposite to the transfer section described above. On the second wheel 102 side, the holder plates 147 and 167 are opened at a position substantially opposite to the transfer section described above, and the slider 185 is moved forward to push out the cigarette group 29 in order to transfer it to the subsequent process.

The arrangements of the respective components described above will be described. As shown in FIG. 2, each of the wheels 2 and 102 constitutes a substantially cylindrical shape having three flange portions. The pivotal bodies 3 and 103 are pivotally supported between the two front-side flange portions by the shafts 6 and 106, respectively.

Reference numerals 4 and 104 denote stationary cam members, respectively. Cam followers 5 and 105 are fitted in the circumferential cam grooves of the cam members 4 and 104, respectively, and the cam followers 5 and 105 are coupled to the pivotal bodies 3 and 103 through links, respectively. Hence, when the wheels 2 and 102 are rotated, the directions of the pivotal bodies 3 and 103 are controlled in response to this rotation so that they are directed in predetermined directions. Then, when the pivotal bodies 3 and 103 are moved through the transfer section, they constantly oppose each other.

Figure 5:
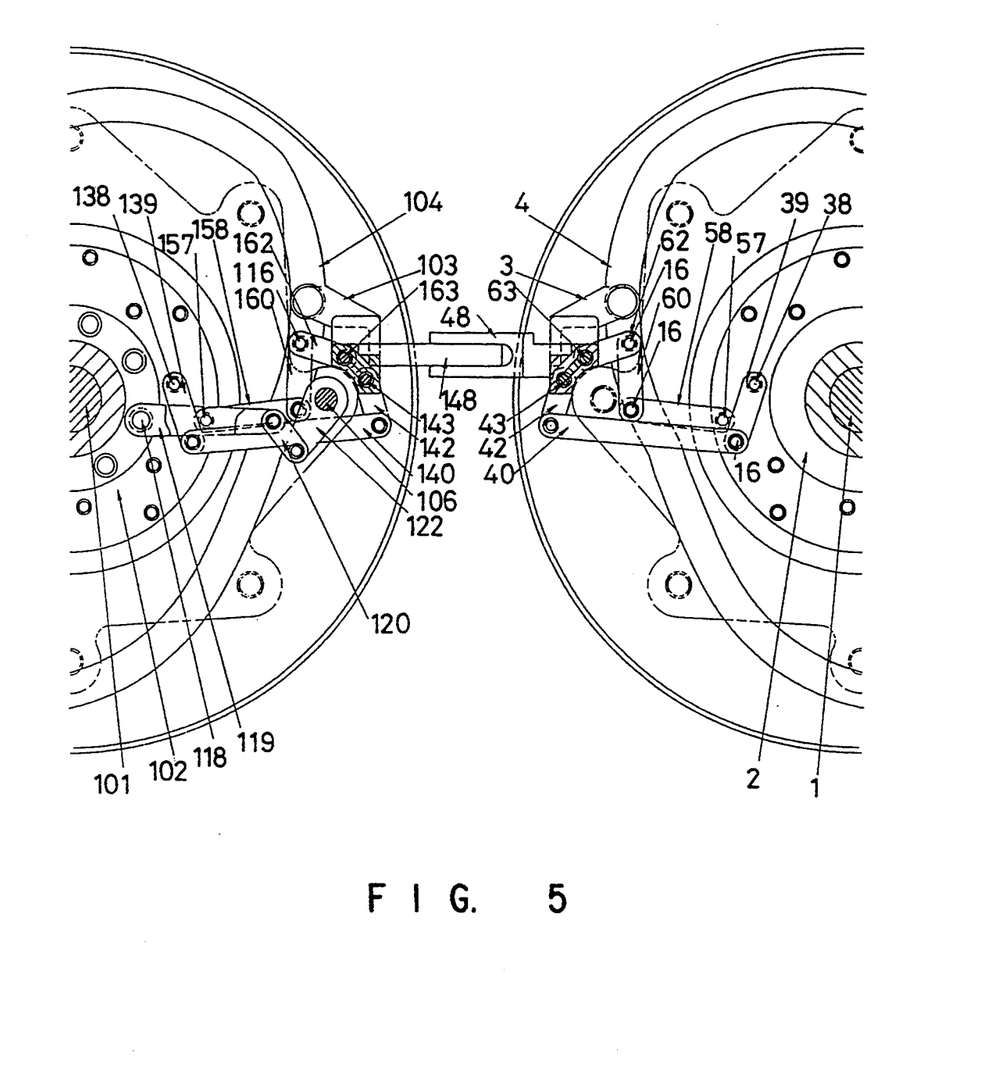
FIG. 5 is a sectional view taken along the line V—V of FIG. 2.
Figure 6:
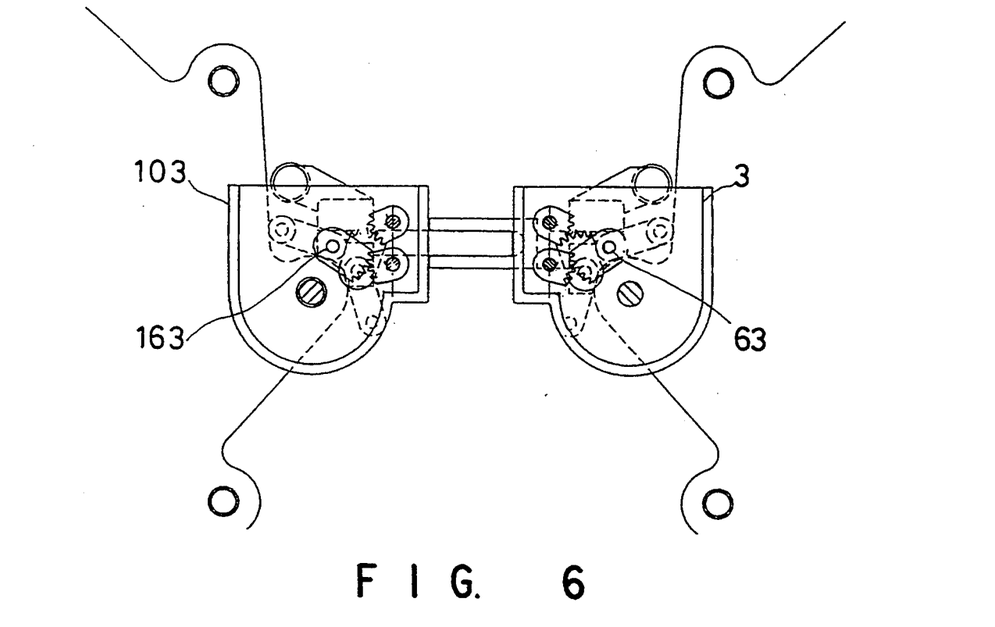
FIG. 6 is a sectional view taken along the line VI—VI of FIG. 2.

Fitting guide members 48 and 148 respectively project from the pivotal bodies 3 and 103 of the heads 9 and 109 in predetermined directions, as shown in FIGS. 2 and 5. The fitting guide members 48 and 148 are fitted with and slide on each other when the pivotal bodies 3 and 103 oppose each other. Hence, when the pivotal bodies 3 and 103 oppose each other and move through the predetermined transfer section, the fitting guide members 48 and 148 are fitted with and slide on each other to eliminate an adverse influence, e.g., a play of the cam mechanism described above, thereby maintaining the pivotal bodies 3 and 103 to accurately oppose each other.

Figure 3:
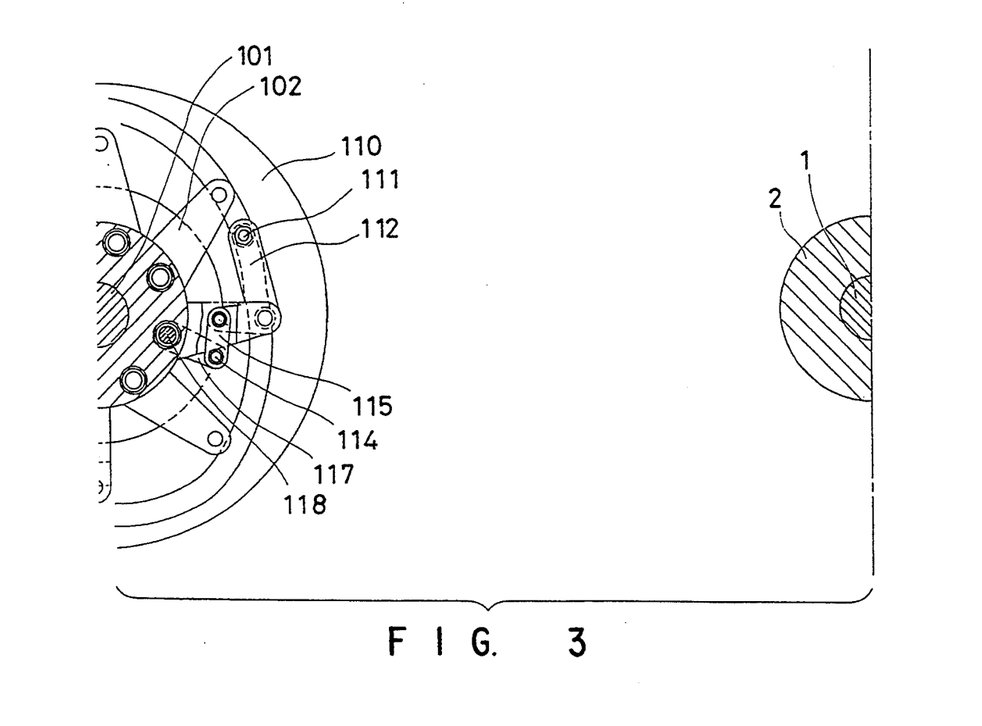
FIG. 3 is a sectional view taken along the line III—III of FIG. 2.
Figure 4:
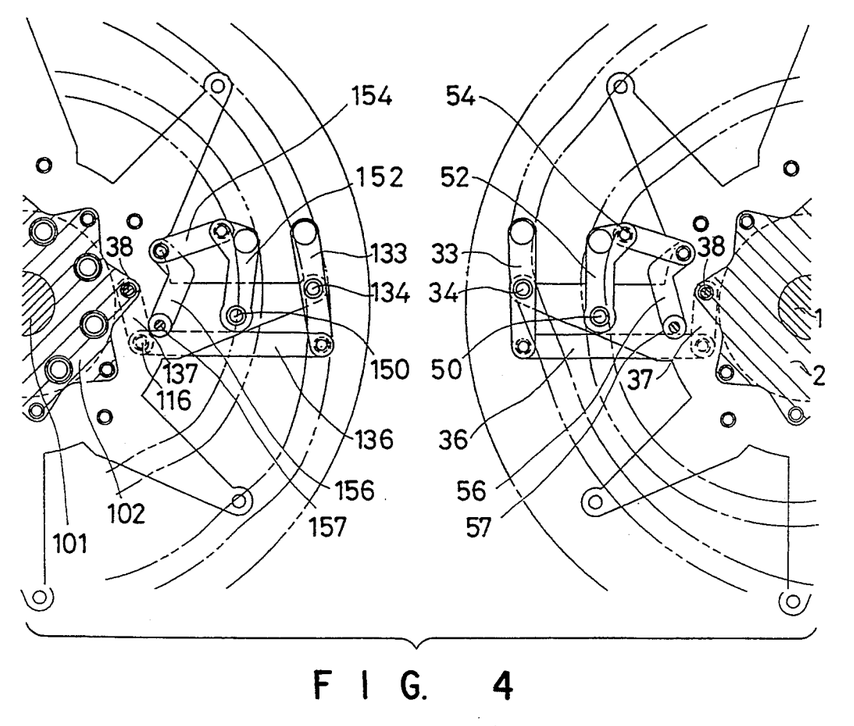
FIG. 4 is a sectional view taken along the line IV—IV of FIG. 2.

The mechanism for opening and closing the plates 128 and 196 of the second wheel 102 has the following arrangement. That is, a stationary cam 110 is provided to this mechanism, as shown in FIGS. 2 and 3, and a cam follower 111 is fitted in the circumferential cam groove of this cam 110. The cam follower 111 is coupled to the shaft 106 through a link 115, a lever 117, a shaft 118, a lever 119, a link 120, and a lever 122. The cam groove of the cam 110 causes the shaft 106 to pivot while the head 109 of the second wheel 102 moves through the transfer section.

Figure 7:
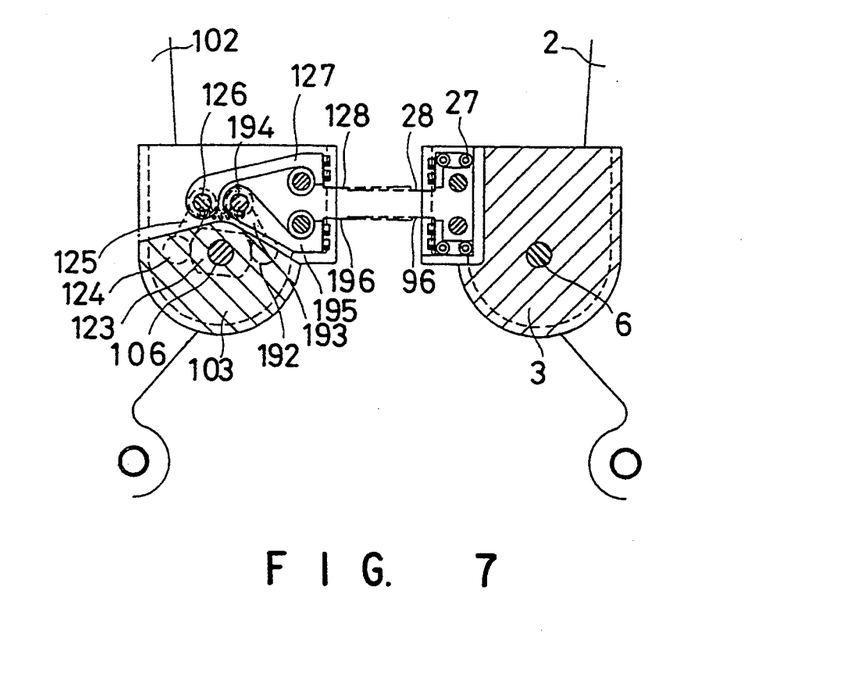
FIG. 7 is a sectional view taken along the line VII—VII of FIG. 2.

As shown in FIG. 7, a cam 123 is mounted on the shaft 106, and the cam 123 is pivoted together with the shaft 106. Cam followers 124 and 192 rotatably contact the cam 123, and the cam followers 124 and 192 are coupled to the plates 128 and 196 through levers 125 and 193, shafts 126 and 194, and levers 127 and 195. Thus when the head 109 passes through the transfer section, the plates 128 and 196 are opened by the opening/closing mechanism described above to increase the distance between them, and the plates 28 and 96 of the head 9 of the first wheel 2 are inserted between the plates 128 and 196. When the plates 28 and 96 of the first wheel 2 are withdrawn from the portion between the plates 128 and 196, the plates 128 and 196 are closed to hold the cigarette group 29 which has been transferred to them so as not to collapse it.

The cam mechanisms for opening/closing the holder plates 47 and 67, and 147 and 167 have an arrangement as shown in FIGS. 2, 4, 6, and 8. The cam mechanisms on the first and second wheels 2 and 102 side have similar arrangements. As their operations for opening/closing the corresponding holder plates are slightly different from each other, the shapes of the cam grooves are different from each other accordingly.

That is, stationary cams 31 and 131 are provided in the vicinities of the wheels 2 and 102, respectively, and two circumferential cam grooves are formed in each of the cams 31 and 131. Cam levers 33 and 52, and 133 and 152 are pivotally mounted on the wheels 2 and 102 by stud pins 34 and 50, and 132 and 150, respectively, and cam followers 32 and 51, and 132 and 151 are mounted on the distal end portions of the cam levers 33 and 52, and 133 and 152, respectively, and fitted in the corresponding cam grooves.

The cam levers 33 and 52 are coupled to shafts 38 and 57 through links 36 and 54 and levers 37 and 56, respectively, and are further coupled to shafts 43 and 63 through levers 39 and 58, links 40 and 60, and levers 42 and 162, respectively. The cam levers 133 and 152 are coupled to shafts 138 and 157 through links 136 and 154 and levers 137 and 156, respectively, and are further coupled to shafts 143 and 163 through levers 139 and 158, links 140 and 160, and levers 142 and 162, respectively. The holder plates 47, 67, 147, and 167 are mounted on the shafts 43, 63, 143, and 163, respectively. Hence, these holder plates are kept open by these opening/closing mechanisms as they pass through the transfer section, and the cigarette groove 29 is transferred from the head 9 of the first wheel 2 to the head 109 of the second wheel 102. On the second wheel 102 side, the holder plates 147 and 167 are also open when the cigarette group is to be transferred from the wheel 102 to the subsequent process, and the corresponding cam grooves are formed to perform this operation.

Figure 8:
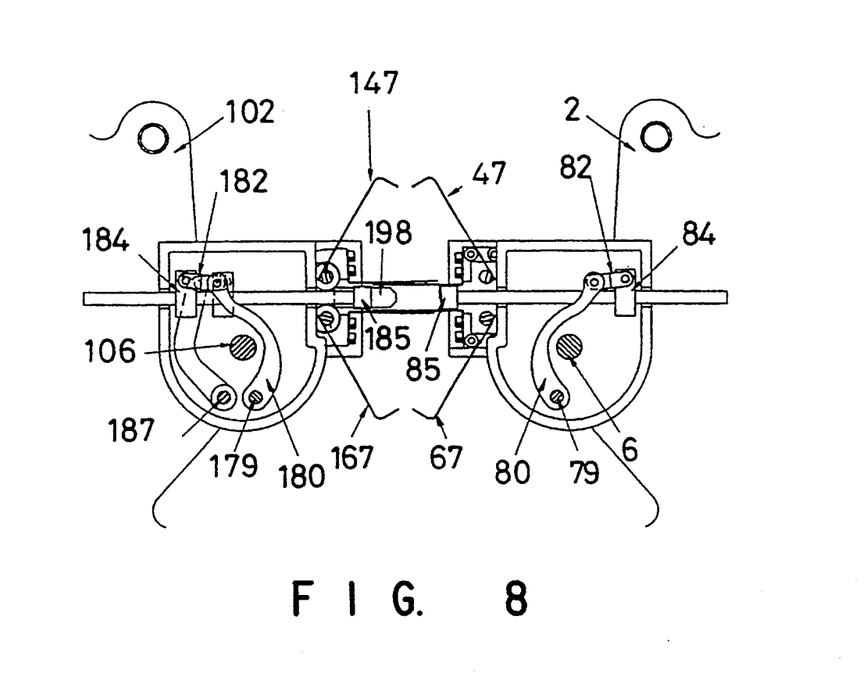
FIG. 8 is a sectional view taken along the line VIII—VIII of FIG. 2.
Figure 9:
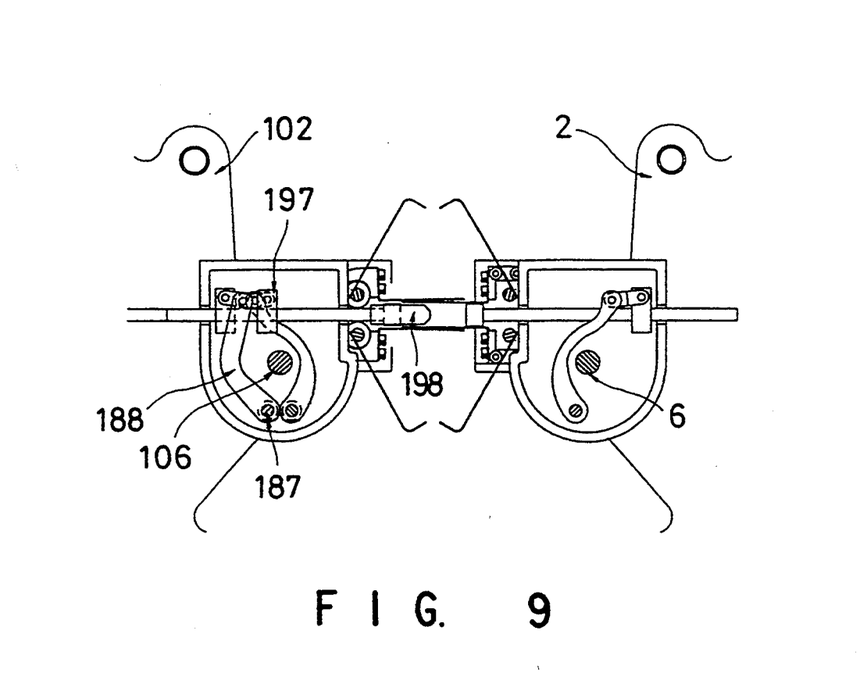
FIG. 9 is a sectional view taken along the line IX—IX of FIG. 2.

The drive mechanisms for reciprocating the sliders 85 and 185 have arrangements as shown in FIGS. 2 and 8. That is, reference numerals 71 and 171 denote stationary cams, and cam followers 72 and 172 are fitted in circumferential cam grooves formed in the cams 71 and 171, respectively. Referring to FIG. 2, the cam followers and cam levers of the second wheel 102 are drawn at positions disengaged from the cam grooves so that they do not overlap in the drawing.

Stud pins 74 and 174 are mounted on the wheels 2 and 102, respectively, and cam levers 73 and 173 are pivotally supported by the stud pins 74 and 174, respectively. The cam followers 72 and 172 are mounted on the distal end portions of the cam levers 73 and 173, respectively. The cam levers 73 and 173 are coupled to shafts 79 and 179 through links 76 and 176 and the levers 78 and 178, respectively. The pivotal movements of the shafts 79 and 179 are converted to reciprocal linear movements of the sliders 85 and 185 by arms 80 and 180, links 82 and 182, and link blocks 84 and 184, respectively.

The sliders 85 and 185 are moved forward and backward by the drive mechanisms described above in response to the rotations of the wheels 2 and 102, respectively. For example, in the transfer section, the slider 85 of the first wheel 2 is moved forward, and the slider 185 of the second wheel 102 is moved backward to transfer the cigarette group 29. At a position substantially opposite to the transfer section, the slider 185 of the second wheel 102 is moved forward to push out a held cigarette group 29 in order to transfer it to the subsequent process.

Figure 10:
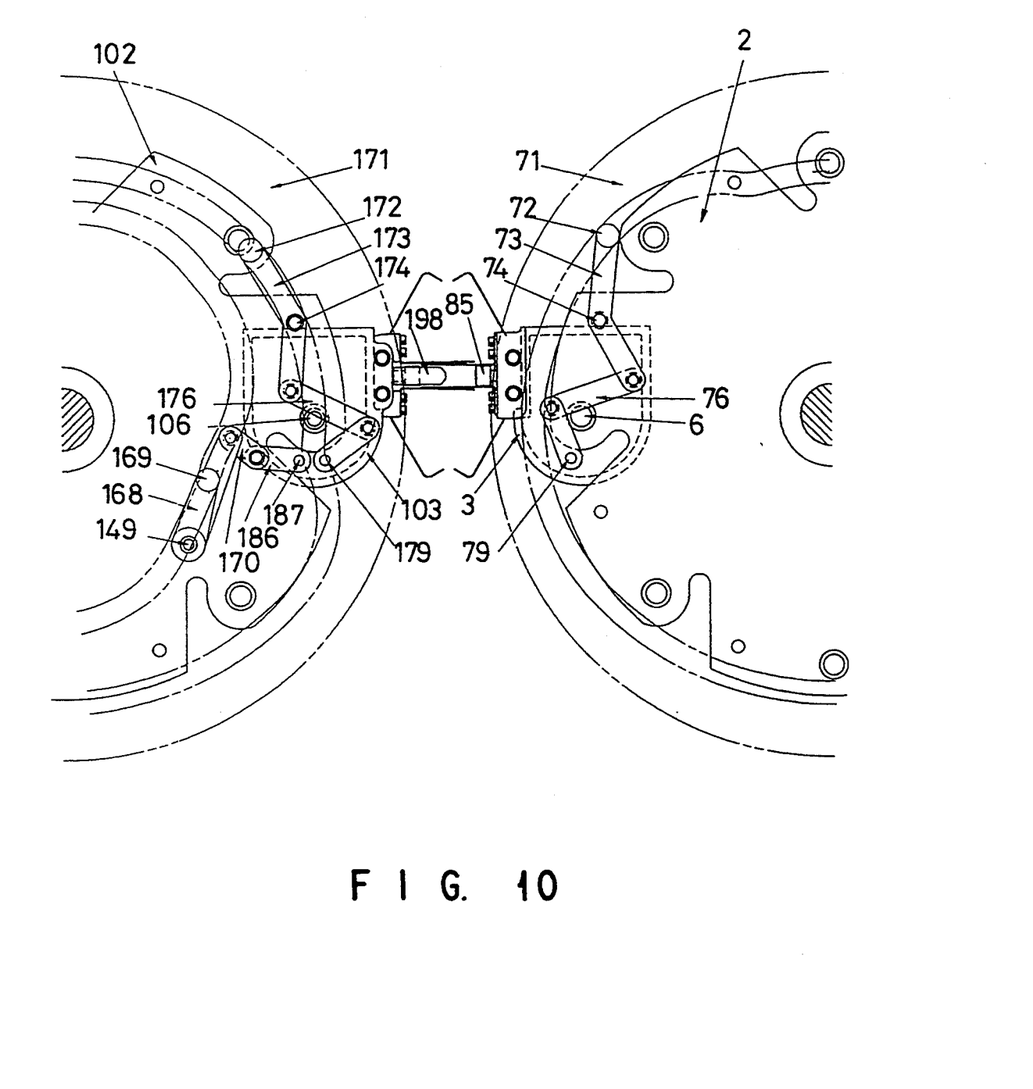
FIG. 10 is a sectional view taken along the line X—X of FIG. 2.

In the apparatus of this embodiment, the cigarette group 29 is wrapped with the wrapping paper 30 while it is being transferred. In order to fold the side edge portion of the wrapping paper 30 wrapping the cigarette group therein, an edge folding mechanism as shown in FIGS. 2, 8, and 10 is provided to the second wheel 102.

More specifically, a cam lever 168 is pivotally supported on the second wheel 2 by a stud pin 149. A cam follower 169 is provided on the distal end portion of the cam lever 168. The stationary cam 171 is provided in the vicinity of the second wheel 102, and the cam follower 169 is fitted in the circumferential cam groove of the cam 171. The cam lever 168 is coupled to a shaft 187 through a link 170 and a lever 186, and the shaft 187 is pivotally provided in the pivotal body 103. Edge folding members or tacker members 198 are provided to two sides of the pivotal body 103 to be capable of being moved forward and backward. The pivot movement of the shaft 187 is converted to the reciprocal linear movements of the edge folding members 198 by an arm 188, a link 190, and a link block 197.

In the apparatus having the above structure, the plates 28, 96, 128, and 196, holder plates 47, 67, 147, and 167, sliders 85 and 185, etc., are operated at predetermined timing, and perform a series of operations as will now be discussed.

The first and second rotary wheels 2 and 102 are rotated at the same peripheral velocity in opposite directions as shown by arrows of FIG. 1. When the head 9 of the first rotary wheel 2 is moved to a position substantially opposite to the transfer section, the cigarette group 29 is supplied from pretreatment equipment to the plates 28 and 96 of the head 9 of the first rotary wheel 2 in a direction perpendicular to the drawing sheet of FIG. 1. In this case, the holder plates 47 and 67 are closed. The cigarette group 29 is held between the plates 28 and 96. Therefore, the cigarette group 29 is held in such a manner as to be surrounded by these plates 28, 96, 47, and 67, and thus does not collapse.

When the head 9 of the first rotary wheel 2 is moved to the transfer section, the direction of the pivotal body 3 is controlled. In the same manner, the direction of the pivotal body 103 of the head 109 of the second rotary wheel 102 is controlled. The heads 9 and 109 face each other until the heads 9 and 109 have passed the transfer section. In this case, the fitting guide member 48 is slidably fitted in the fitting guide member 148, thereby to keep the heads 9 and 109 accurately facing each other until the heads 9 and 109 have passed the transfer section.

Figure 13:
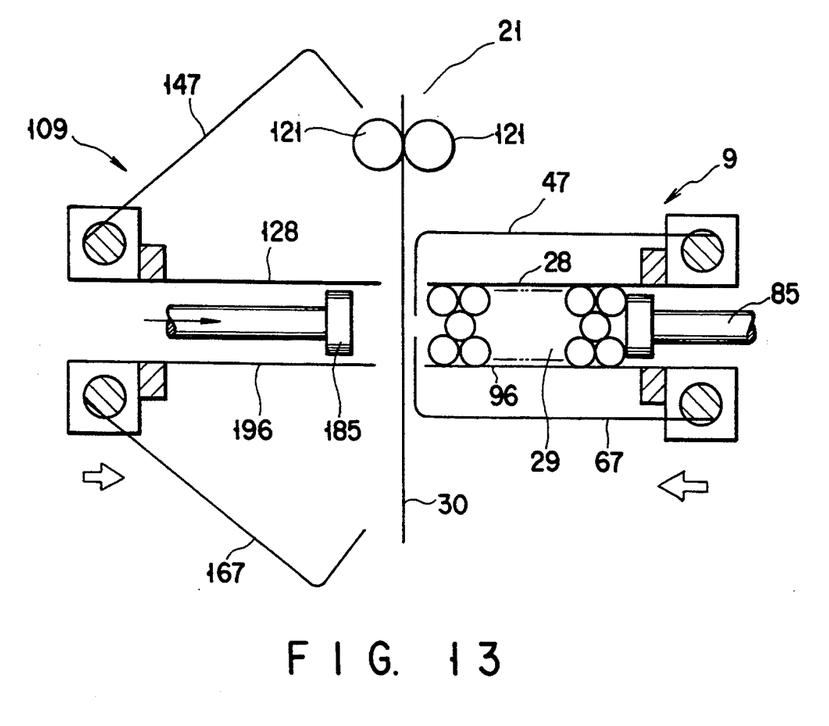
FIG. 13 is a schematic view illustrating operations of heads.

At the beginning of the passing time when the heads 9 and 109 pass through the transfer section, as shown in FIG. 13, the holder plates 147 and 167 of the head 109 of the second rotary wheel 102 are opened, and the holder plates 47 and 67 of the head 9 of the first rotary wheel 2 are closed to thereby prevent the cigarette group 29 from flying out due to a centrifugal force. Further, since the plates 128 and 196 of the head 109 of the second rotary wheel 102 is slightly opened, the plates 28 and 96 of the head 9 of the first rotary wheel 2 is inserted between the plates 128 and 196. In this state, the wrapping paper 30 is inserted between the heads 9 and 109 by a wrapping paper supplying mechanism 21. The insertion of the wrapping paper 30 is synchronized with the movement of the heads 9 and 109, and thus a center portion of the wrapping paper 30 continuously coincides with the center portions of the heads 9 and 109.

Figure 14:
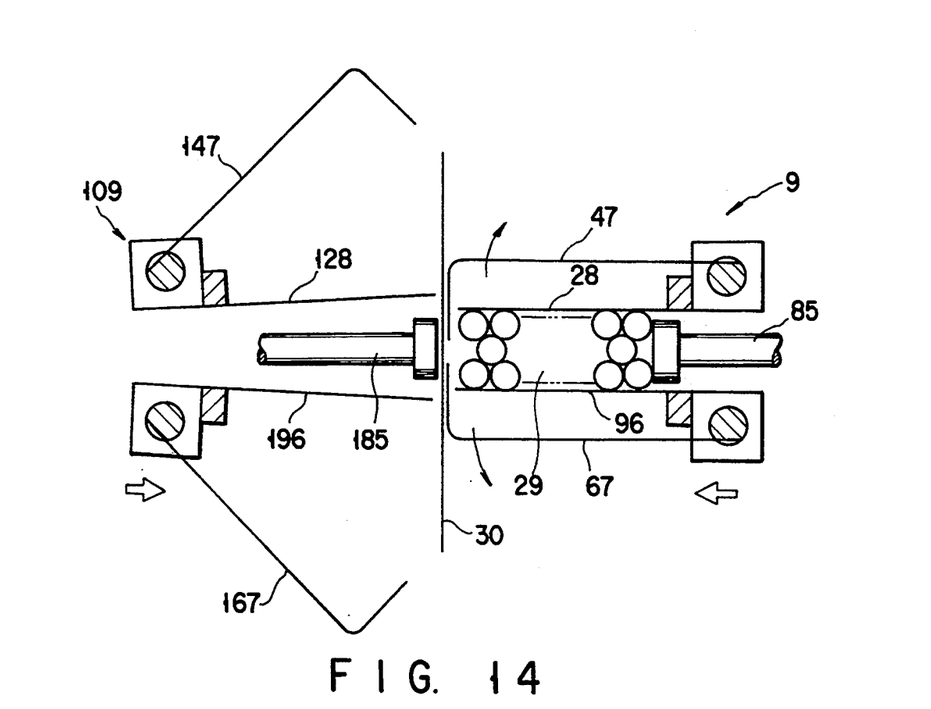
FIG. 14 is a schematic view illustrating operations of the heads.

As shown in FIG. 14, the heads 9 and 109 are moved closer to each other, and simultaneously the slider 185 of the head 109 of the second rotary wheel 102 is brought into contact with the wrapping paper 30.

Figure 15:
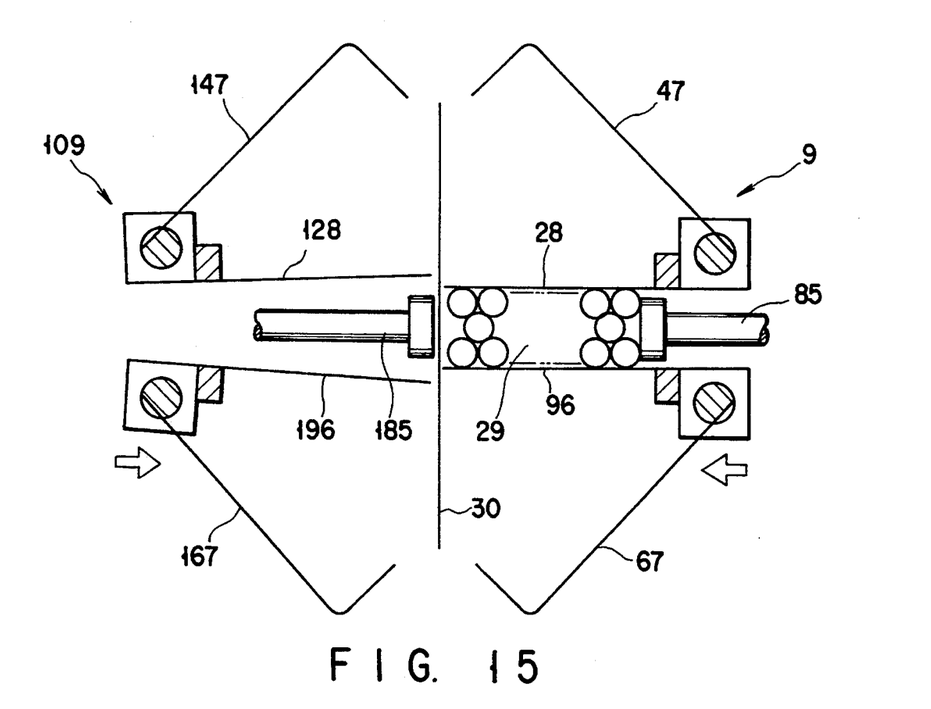
FIG. 15 is a schematic view illustrating operations of the heads.

As shown in FIG. 15, when the slider 185 is brought into contact with the wrapping paper 30, the holder plates 47 and 67 of the head 9 of the first rotary wheel 2 are opened, and the wrapping paper 30 is clamped and held between the slider 185 and the front end portion of the cigarette group 29.

Figure 16:
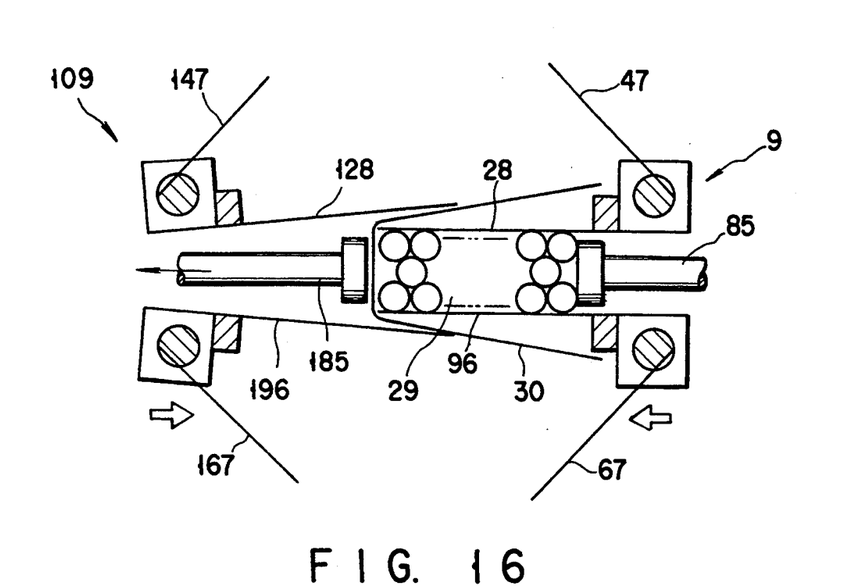
FIG. 16 is a schematic view illustrating operations of the heads.

When the heads 9 and 109 are moved further, the plates 28 and 96 holding the cigarette group 29 are inserted between the plates 128 and 196. In this case, the slider 185 of the head 109 is moved backward in synchronism with the insertion of the plates 28 and 96 of the head 9. Therefore, in this case as well, the wrapping paper 30 is kept clamped and held between the slider 185 of the head 109 and the front end portion of the cigarette group 29. Further, by virtue of the insertion of the plates 28 and 96 of the head 9, the wrapping paper 30 is folded in the form of a square blanket (⌐) so as to wrap the cigarette group 29.

Figure 17:
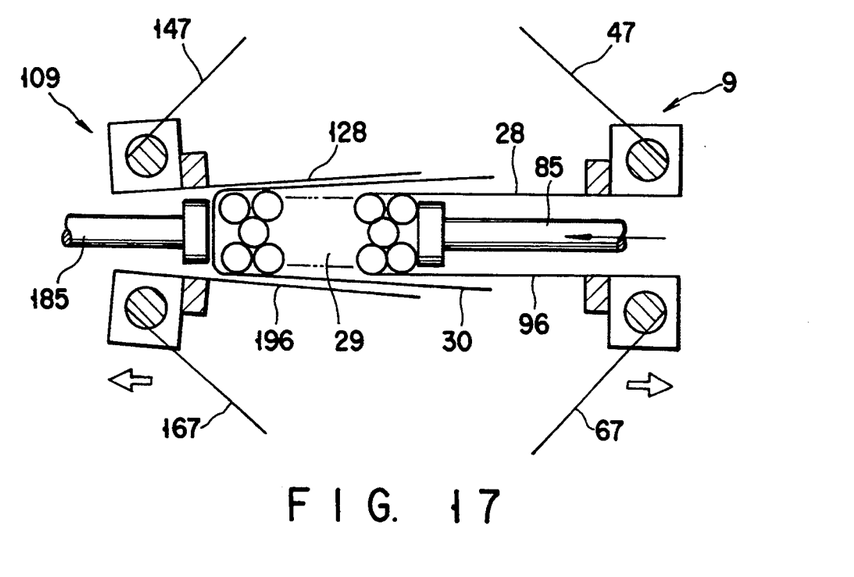
FIG. 17 is a schematic view illustrating operations of the heads.

In such a manner, as shown in FIG. 17, the plates 28 and 96 are moved deeper into the space defined by the plates 128 and 196 of the head 109 so that front ends of the plates 28 and 96 reach rear ends of the plates 128 and 196. Consequently, the cigarette group 29 held between the plates 28 and 96 has completely been moved into the space defined by the plates 128 and 196.

When the heads 9 and 109 are moved further, they are gradually separated from each other, and the plates 28 and 96 of the head 9 are withdrawn from the space defined by the plates 128 and 196. In this case, the slider 185 of the head 109 is not moved, and the slider 85 of the head 9 is moved forward in synchronism with the withdrawal of the plates 28 and 96 of the head 9 so as to push out the cigarette group 29. Consequently, the cigarette 29 has completely been transferred from the plates 28 and 96 to the plates 128 and 196. At the same time, the wrapping paper 30 is completely folded in the form of a square blanket so as to wrap the cigarette 29.

When the cigarette group 29 is transferred at the transfer section in this manner, the holder plates 147 and 167 of the second wheel 102 are closed by the cam mechanism to hold the cigarette group 29 wrapped with the wrapping paper 30 so that it will not drop.

Simultaneously, the edge holding member 198 is moved forward to fold the side edge portion of the wrapping paper 30 to form an edge-folded portion, thereby substantially shaping the wrapping paper 30 into a form of package.

When the head 109 of the second wheel 102 which holds the cigarette group 29 is moved to the position substantially opposite to the transfer section, the holder plates 147 and 167 are opened again by the cam mechanism, and the slider 185 is moved forward by the drive mechanism to push out the cigarette group 29 wrapped with the wrapping paper 30 and to transfer it to a unit for executing the following process. Note that each edge folding member 198 is moved forward by the cam mechanism while the cigarette group 29 is transferred from the second wheel 102 to the following process so that the folded edge of the wrapping paper 30 will not be straightened.

Figure 18:
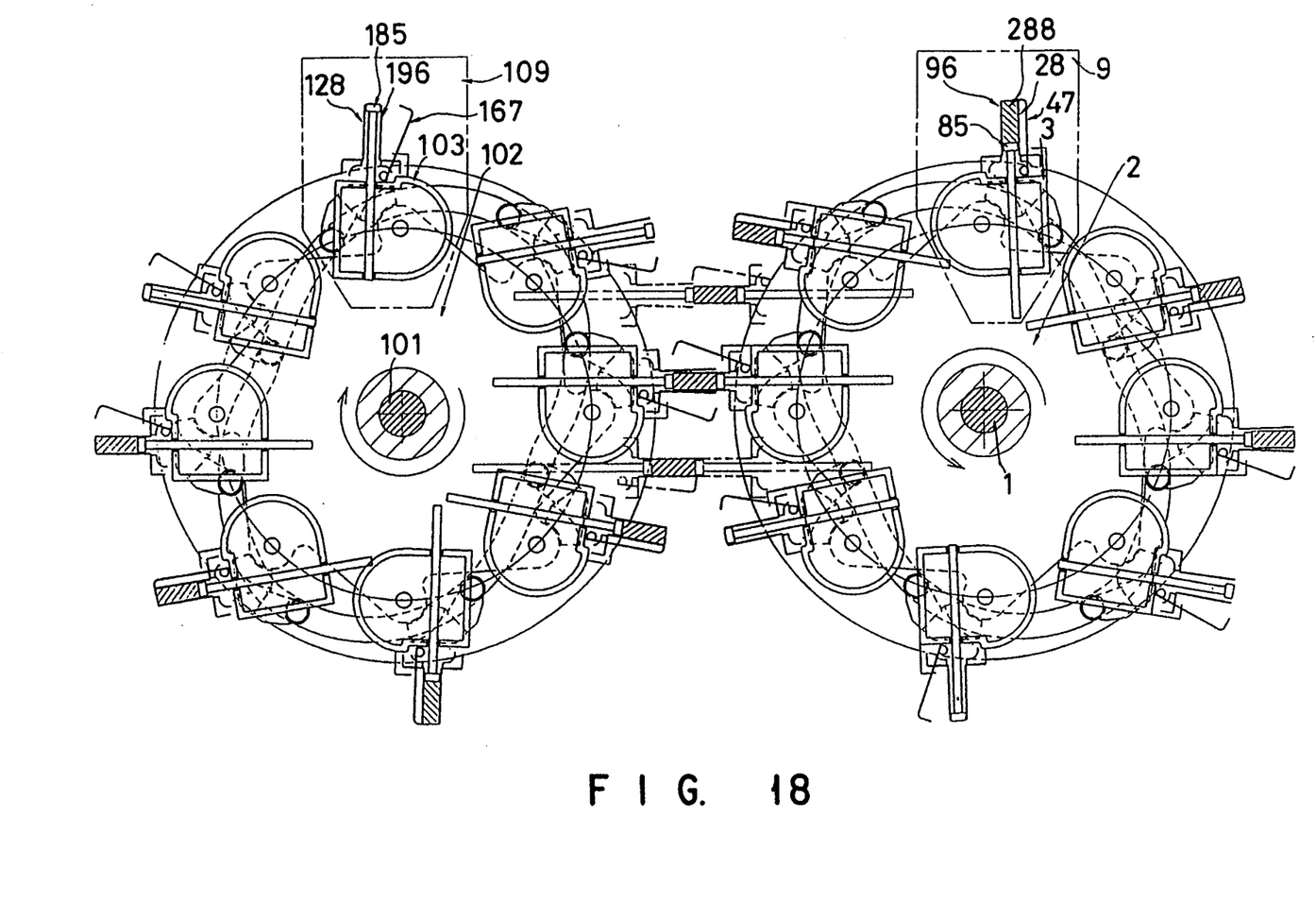
FIG. 18 is a schematic front view showing an apparatus according to the second embodiment of the present invention.

The above embodiment exemplifies the apparatus for transferring the cigarette group 29 and for wrapping the cigarette group 29 during transfer. However, the present invention can be similarly applied to an apparatus which does not perform wrapping but simply transfers an article. FIG. 18 shows an apparatus according to the second embodiment of the present invention which transfers an article, e.g., an already wrapped cigarette package 288.

Since the cigarette package 288 is already wrapped, only one holder plate 47 or 167 for preventing drop of the cigarette package is provided for this apparatus. No rollers for supplying wrapping paper are provided, as a matter of course. Excluding these points, the second embodiment has the same arrangement as that of the first embodiment described above. Portions in FIG. 18 corresponding to those of the first embodiment are denoted by the same reference numerals and a detailed description thereof is omitted.

The present invention is not limited to an apparatus for transferring or transferring/wrapping cigarettes but can be apparently similarly applied to an apparatus for transferring or transferring/wrapping other articles.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An article transferring and wrapping apparatus comprising:
   at least an article sending-side first rotary wheel having a plurality of first heads;
   at least an article receiving-side second rotary wheel having a plurality of second heads, said first and second rotary wheels being provided adjacent to each other and rotated around parallel axes in opposite directions at the same peripheral velocity and transferring an article held by one of said heads of said sending-side first wheel to one of said heads of said receiving-side second wheel while said heads move through a transfer section while said first and second rotary wheels are adjacent to each other; and a wrapping paper sheet supplying mechanism for supplying wrapping paper sheets into a space between said first and second heads in the transfer section, thereby wrapping the article with the wrapping paper sheet, while the article is being transferred between first and second heads in the transfer section, each of said first and second heads including:

a pivotal body pivotally provided to a corresponding one of said first and second rotary wheels;

a pivotal mechanism for pivoting said pivotal bodies in response to rotation of the corresponding one of said first and second rotary wheels so that said pivotal bodies of each of said first and second heads are moved opposing each other while passing through said transfer section;

a pair of plates projecting from each of said pivotal bodies, for holding the article therebetween, the plates being openable and closeable so that a space therebetween can be widened or narrowed;

an opening and closing mechanism for opening and closing said pair of plates, said plates of each of said heads of said second rotary wheel being opened in opposing directions by said opening and closing mechanism while passing through said transfer section, a pair of plates of each of said first heads being closed by said opening and closing mechanism so that the article is held by said heads of said first rotary wheel while each of the first heads is passing through said transfer section, and said first rotary wheel comprising means for inserting said pair of plates of each of said first heads holding the article into an open space between said pair of plates of each of said second heads and thereafter withdrawing said pair of plates of each of said first heads holding the article from the open space, thereby transferring the article held by said pair of plates of each of the first heads to the space between said pair of plates of each of the second heads; and a cam mechanism having a slider, the sliders of each of said first heads being moved forwardly toward the second rotary wheel so as to push the article held between said pair of plates of each of said first heads, when said pair of plates of each of said first heads is withdrawn from the space between said pair of plates of each of said second heads, thereby transferring the article into the open space between said pair of plates of each of said second heads, and the slider of each of said second heads being moved backwardly, in response to forward movement of the sliders of each of said first heads, to hold the article in cooperation with said forwardly moved slider of each of said first heads.

2. An apparatus according to claim 1, wherein fitting guide members are provided on said heads, said fitting guide member of said head of said first rotary wheel being slidably fitted with said fitting guide member of said head of said second rotary wheel while said heads move through said transfer section in order to guide said heads to opposite states while said heads of said first and second rotary wheels move through said transfer section.

* * * * *